(12) United States Patent
Chen et al.

(10) Patent No.: US 8,302,260 B2
(45) Date of Patent: Nov. 6, 2012

(54) HINGE ASSEMBLY

(75) Inventors: Wei-Chun Chen, Shulin (TW);
Weiming Chen, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 462 days.

(21) Appl. No.: 12/591,465

(22) Filed: Nov. 20, 2009

(65) Prior Publication Data

US 2011/0119867 A1    May 26, 2011

(51) Int. Cl.
*E05D 11/10* (2006.01)
(52) U.S. Cl. .......... 16/330; 16/303; 16/340; 361/679.27
(58) Field of Classification Search .................... 16/330, 16/303, 340–342, 319, 386, 387, 337, 297; 379/433.13; 455/575.3; 361/679.27; 348/333.06
See application file for complete search history.

(56) References Cited

U.S. PATENT DOCUMENTS

| 6,862,779 | B1 * | 3/2005 | Lu et al. | 16/340 |
| 7,107,648 | B1 * | 9/2006 | Lu et al. | 16/330 |
| 7,222,396 | B2 * | 5/2007 | Lu et al. | 16/340 |
| 7,430,786 | B1 * | 10/2008 | Jian | 16/330 |
| 7,533,446 | B1 * | 5/2009 | Lin | 16/330 |
| 7,631,398 | B1 * | 12/2009 | Lin | 16/341 |
| 7,669,286 | B2 * | 3/2010 | Lu et al. | 16/340 |
| 7,685,679 | B2 * | 3/2010 | Horng | 16/330 |
| 7,784,154 | B2 * | 8/2010 | Chen | 16/342 |
| 7,870,644 | B2 * | 1/2011 | Chang | 16/337 |
| 7,975,348 | B2 * | 7/2011 | Lin | 16/337 |
| 8,015,668 | B2 * | 9/2011 | Wang | 16/338 |
| 2011/0088219 | A1 * | 4/2011 | Huang et al. | 16/319 |

* cited by examiner

*Primary Examiner* — William L. Miller
(74) *Attorney, Agent, or Firm* — Bacon & Thomas, PLLC

(57) ABSTRACT

A hinge assembly has a pintle, a stationary leaf, a rotating leaf, a rotating pressing disk, a stationary pressing disk, a biasing assembly and a fastener. The rotating pressing disk is mounted rotatably around the pintle, is attached non-rotatably to the rotating leaf and has a track face, an inner track and an outer track. The stationary pressing disk is mounted securely around the pintle and has a protrusion face, an inner protrusion and an outer protrusion. The inner and outer protrusions respectively contact slidably with the inner and outer track on the rotating pressing disk. With the arrangement of the inner and outer tracks on the rotating pressing disk and the inner and outer protrusions on the stationary pressing disk, the resistance provided by the hinge assembly is variable.

13 Claims, 9 Drawing Sheets

HINGE ASSEMBLY

BACKGROUND OF THE INVENTION

1. Field of the Invention

The present invention relates to a hinge assembly, and more particularly to a hinge assembly mounted between a base and a cover of a portable electronic device to allow the cover to pivotally rotate relative to the base with variable torque.

2. Description of Related Art

A portable electronic device having a pivotable cover, such as a notebook computer, a digital camera or a cell phone has a base and a hinge mounted between the pivotable cover and the base to allow the cover to be pivoted open.

However, the conventional hinge can only provide a fixed torque to the cover so that the user has to use two hands, one holding the base and the other pushing the cover to rotate when opening a laptop. This is inconvenient for user; especially it is not a friendly design for a disable person.

To overcome the shortcomings, the present invention tends to provide a hinge assembly to mitigate or obviate the aforementioned problems.

SUMMARY OF THE INVENTION

One aspect of the present invention is to provide a hinge assembly with variable torques which helps user easily pivot the cover relative to the base.

Another aspect of the present invention is to provide a hinge assembly with variable torques which gives user a smooth feeling in opening process.

Another aspect of the present invention is to provide a designed hinge with variable torques that helps user to quickly open the cover for use of laptops and quickly shut the cover without hitting the base which causes damages on screen.

Another aspect of the present invention is to provide a hinge assembly with variable torques which is a friendly design for a disable person.

In order to achieve the above functions, the hinge assembly of the present invention comprises a pintle, a stationary leaf, a rotating leaf, a rotating pressing disk, a stationary pressing disk, a biasing assembly and a fastener. The rotating leaf is mounted rotatably around the pintle. The rotating pressing disk is mounted rotatably around the pintle, attached non-rotatably to the rotating leaf and has a track face having an inner track and an outer track. The inner track and outer track are each configured to have a contour comprising a series of inner and outer stepped recesses. The stationary pressing disk is slidably mounted but non-rotatably around the pintle and has a protrusion face having an inner protrusion and an outer protrusion. The protrusion face faces to and abuts with the track face of the rotating pressing disk in a way that the inner and outer protrusions contacts slidably with the inner and outer tracks on the rotating pressing disk respectively. The biasing assembly is mounted around the pintle to urge the stationary pressing disk toward the rotating pressing disk so that the hinge with variable torques is achieved due to the contour of the rotating pressing disk. The fastener is mounted securely on one end of the pintle to hold the rotating pressing disk, the stationary pressing disk and the biasing assembly on the pintle.

Therefore, as the hinge is rotated, the torque of the hinge changes depending on rotating angels of the cover relative to the base.

Other objects, advantages and novel features of the invention will become more apparent from the following detailed description when taken in conjunction with the accompanying drawings.

DETAILED DESCRIPTION OF PREFERRED EMBODIMENT

Figure 1:
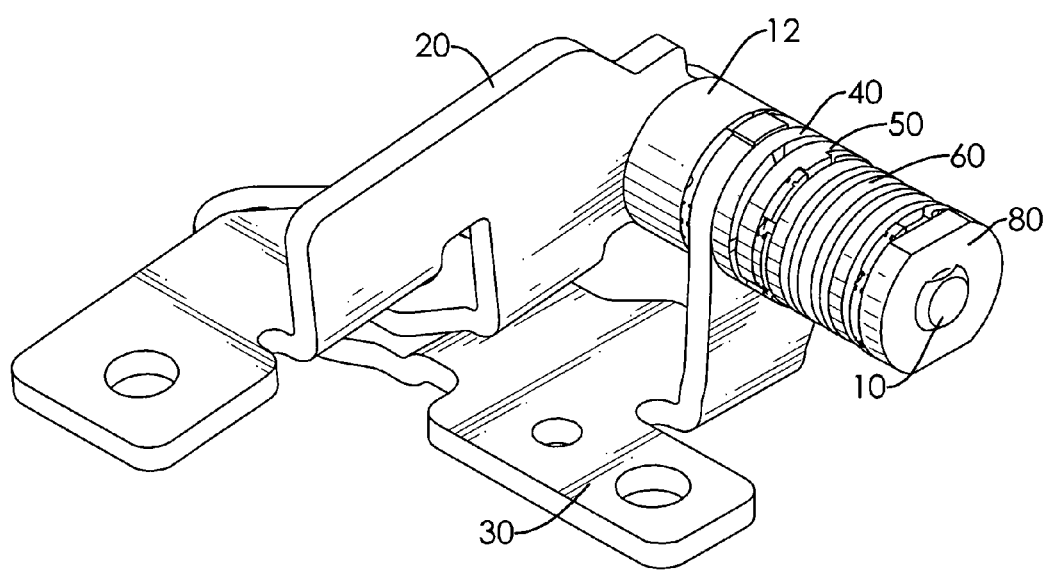
FIG. 1 is a perspective view of a hinge assembly in accordance with the present invention.
Figure 2:
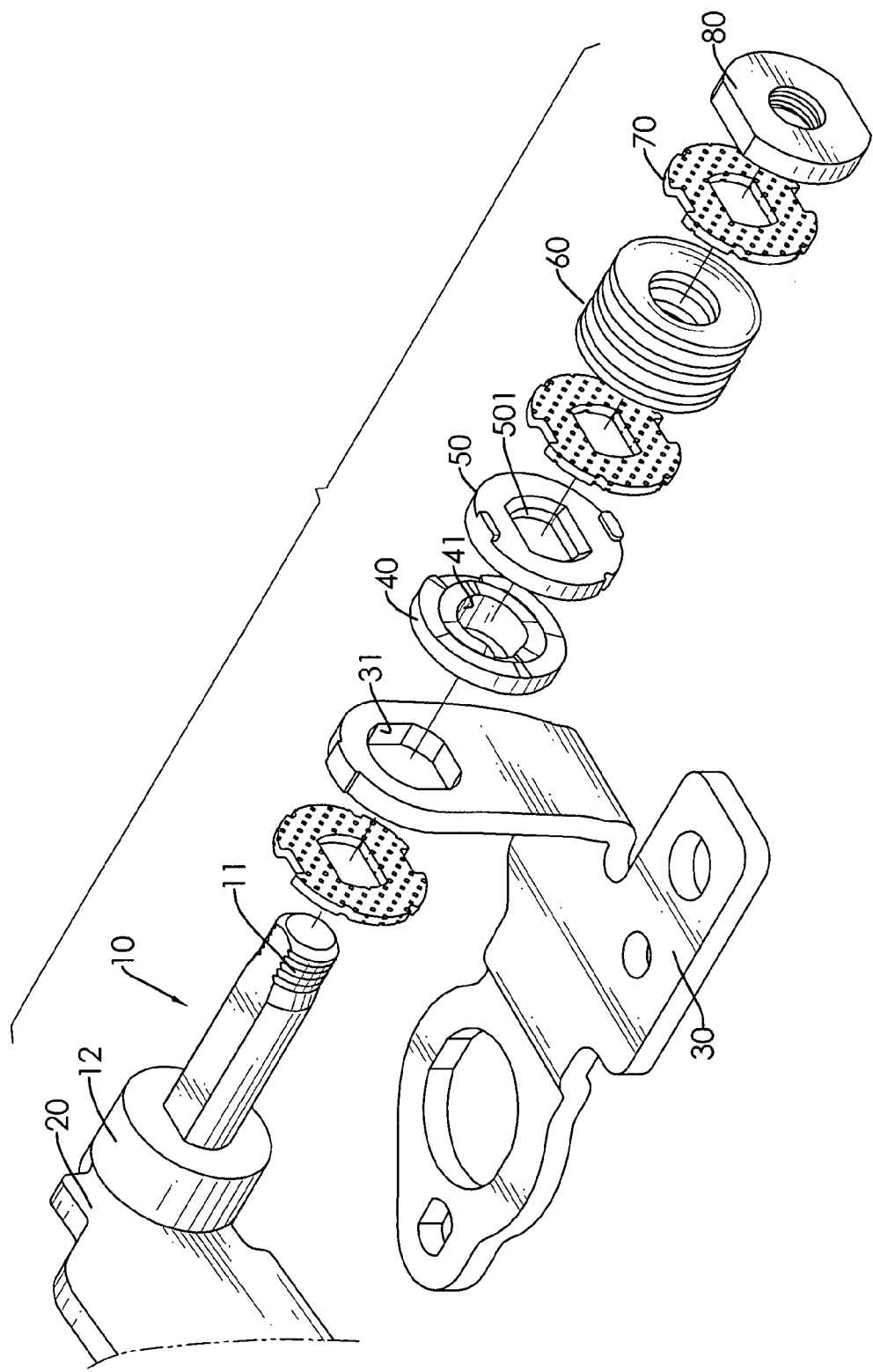
FIG. 2 is an exploded perspective view of the hinge assembly in FIG. 1.
Figure 7:
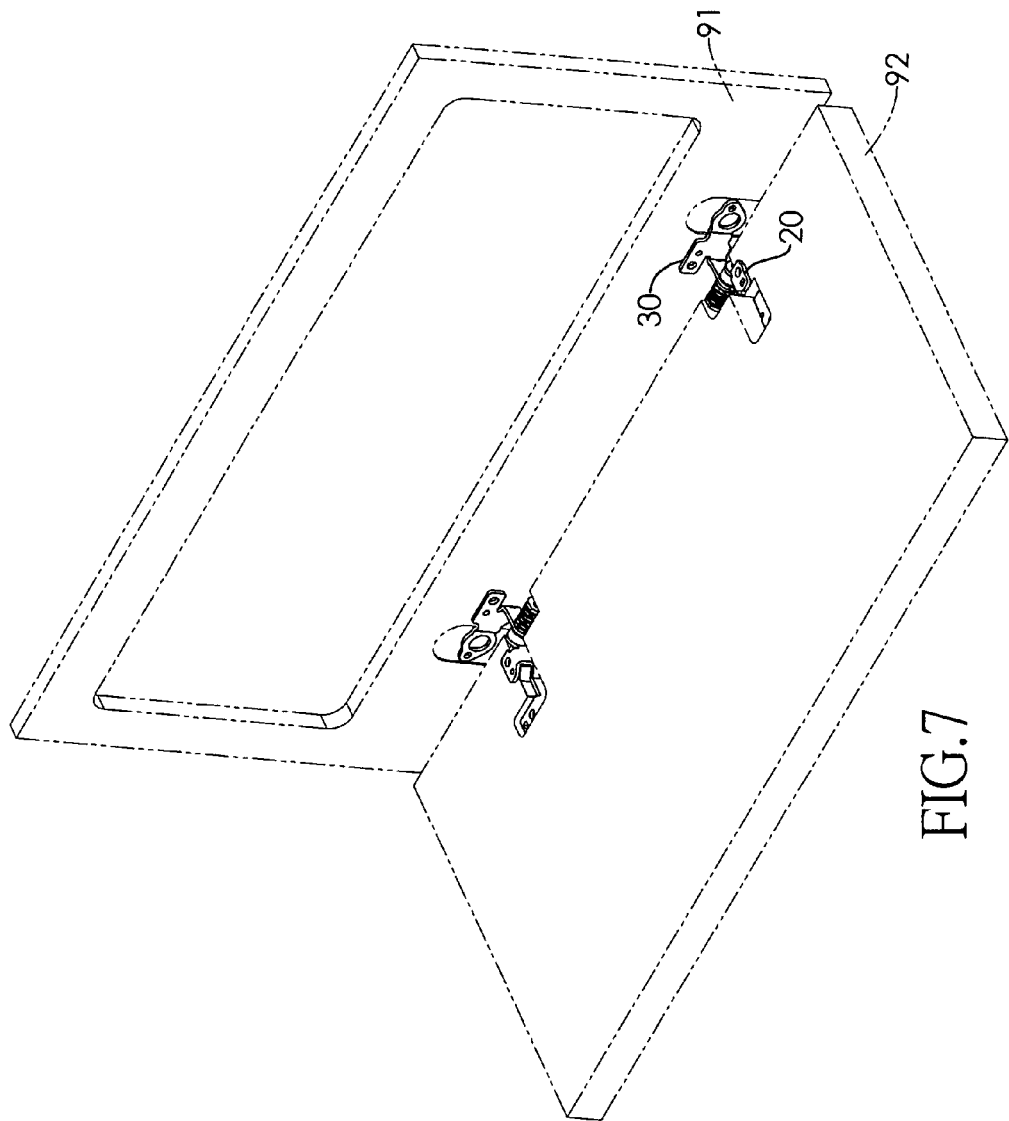
FIG. 7 is a side view of a portable electronic device with the hinge assembly in FIG. 1.

With reference to FIGS. 1, 2 and 7, a hinge assembly in accordance with the present invention is mounted on a portable electronic device, such as a notebook computer, a digital camera or a cell phone. The portable electronic device has a base (92) and a pivotable cover (91) connected pivotally to the base (92) by the hinge assembly. The hinge assembly comprises a pintle (10), a stationary leaf (20), a rotating leaf (30), a rotating pressing disk (40), a stationary pressing disk (50), a biasing assembly (60), a fastener (80) and at least one friction disk (70).

The pintle (10) is connected securely to the base (92) of the portable electronic device and has a noncircular cross section, an outer thread (11) and an enlarged head (12). The outer thread (11) is formed on one end of the pintle (10), and the enlarged head (12) is formed on the other end of the pintle (10).

The stationary leaf (20) is mounted securely on the pintle (10) adjacent to the enlarged head (12) and is mounted securely on the base (92) of the portable electronic device.

The rotating leaf (30) has a through hole (31) to be rotatably mounted on the pintle (10), and is securely attached to the cover (91) of the portable electronic device.

Figure 3:
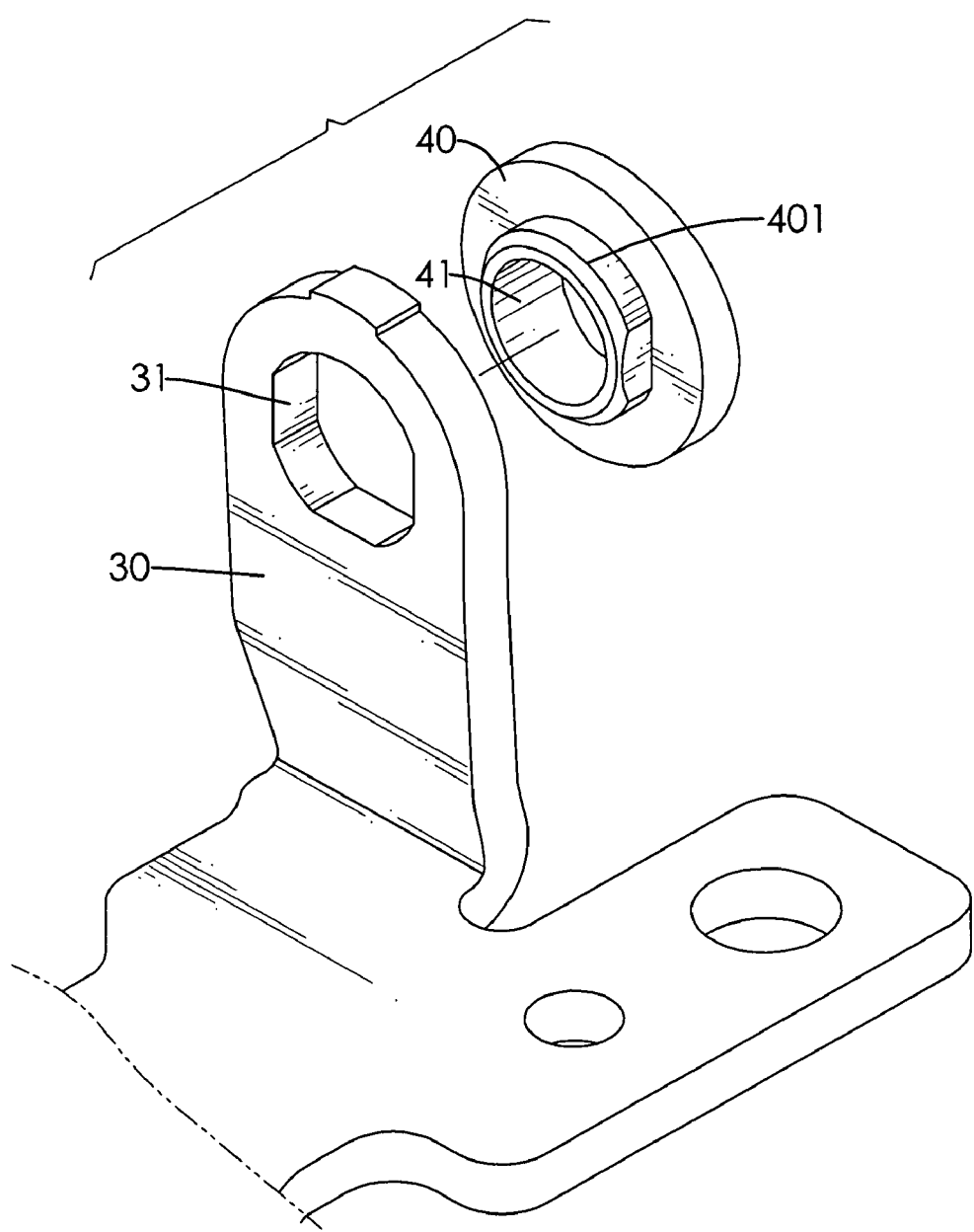
FIG. 3 is an enlarged exploded perspective view of a rotating leaf and rotating pressing disk of the hinge assembly in FIG. 1.
Figure 4:
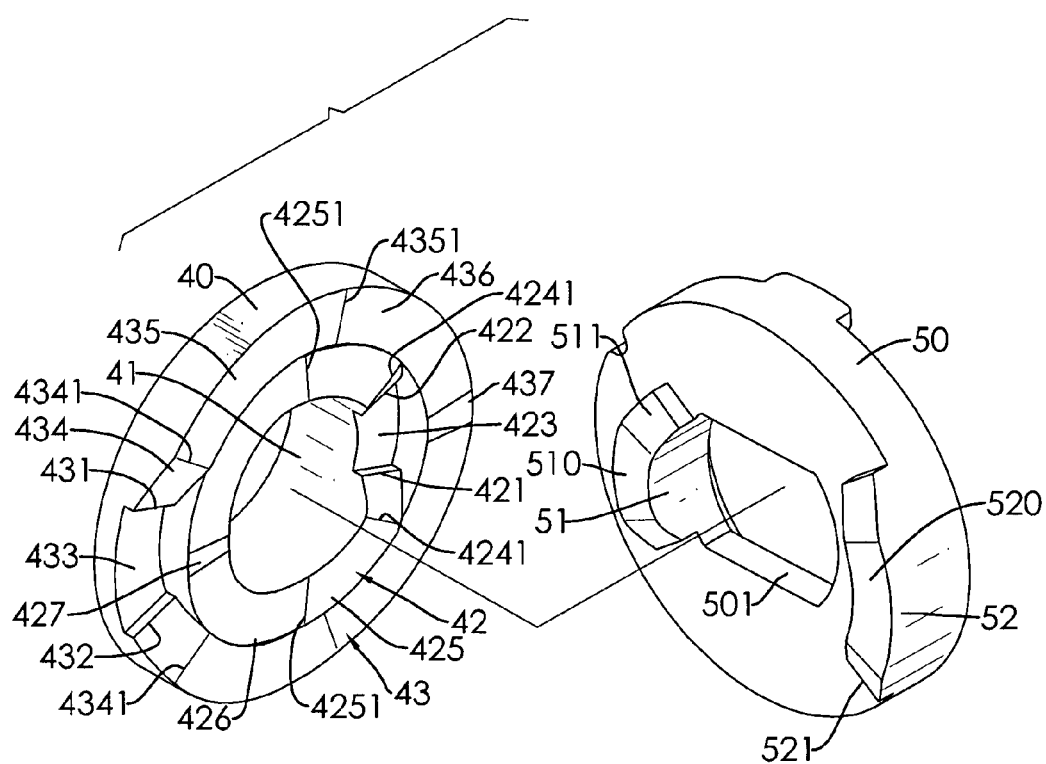
FIG. 4 is an enlarged exploded perspective view of the rotating pressing disk and a stationary pressing disk of the hinge assembly in FIG. 1.

With further reference to FIGS. 3 and 4, the rotating pressing disk (40) is mounted rotatably around the pintle (10), is attached non-rotatably to the rotating leaf (30) and has an axle hole (41), an engaging flange (401), a track face having an inner track (42) and an outer track (43). The axle hole (41) is defined through the rotating pressing disk (40), is mounted rotatably around the pintle (10) and may be round. The engaging flange (401) is annularly formed on the rotating pressing disk (40) around the axle hole (41) to be securely attached to the through hole (31) in the rotating leaf (30) so that the rotating pressing disk (40) rotates with the rotating leaf (30).

Figure 5:
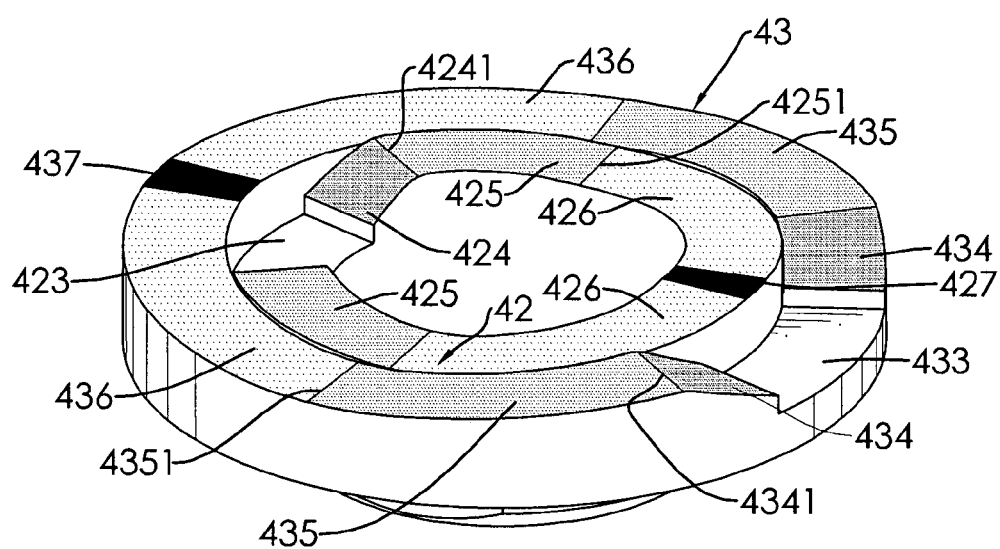
FIG. 5 is an enlarged perspective view of the rotating pressing disk of the hinge assembly in FIG. 1 showing different segments on the rotating pressing disk by shading.
Figure 6:
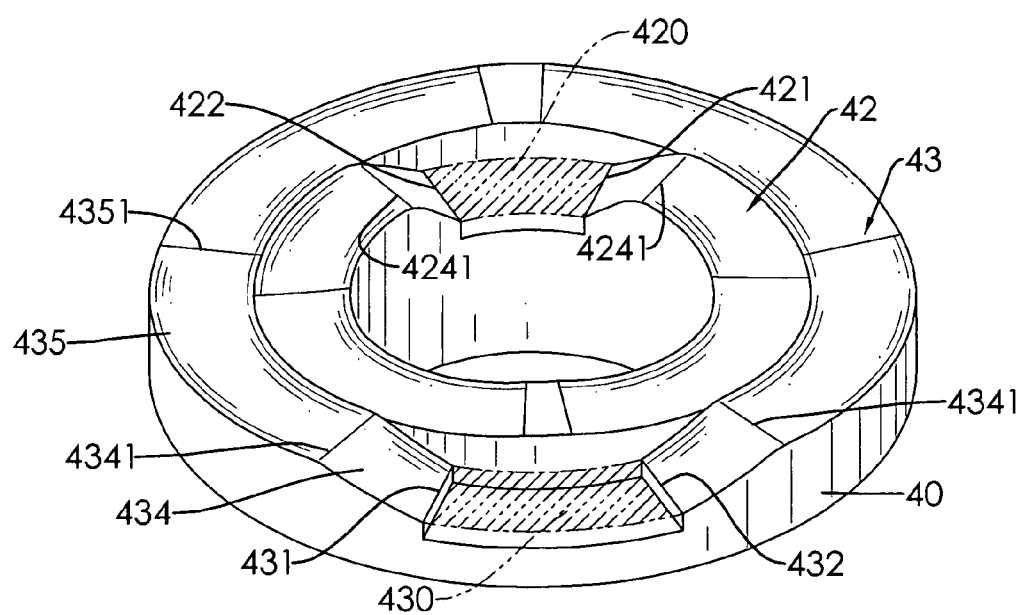
FIG. 6 is another enlarged perspective view of the rotating pressing disk of the hinge assembly in FIG. 1.

With further reference to FIGS. 5 and 6, the track face faces opposite to the rotating leaf (30). The inner track (42) is annularly formed on the track face and has an inner recess (423) having two edges defined as inner initial edges (421, 422), two first inner ramps (424), two second inner ramps (425), two third inner ramps (426) and an inner flat plane (427). The inner initial edges (421,422) include a first inner initial edge (421) and a second inner initial edge (422). The first inner ramps (424) are curved and are connected respectively to the inner initial edges (421,422). Each first inner ramp (424) has a first end connected to a corresponding first inner initial edge (421), a second end (4241) and a thickness gradually increasing from the first end to the second end (4241). The second inner ramps (425) are curved and are connected respectively to the second ends (4241) of the first inner ramps (424). Each second inner ramp (425) has a first end connected to the second end (4241) of a corresponding first inner ramp (424), a second end (4251) and a thickness gradually decreasing from the first end to the second end (4251) of the second inner ramp (425). The third inner ramps (426) are curved and are connected respectively to the second ends (4251) of the second inner ramps (425). Each third inner ramp (426) has a first end connected to the second end (4251) of a corresponding second inner ramp (425), a second end and a thickness gradually increasing from the first end to the second end of the third inner ramp (426). The inner flat plane (427) is formed between the second ends of the third inner ramps (426).

The outer track (43) is annularly formed around the inner track (42) on the track face has an outer recess (433) opposite to and spaced apart from the inner recess (423) by 180 degrees. The outer recess (433) has two edges defined as outer initial edges (431,432). The outer track (43) further has two first outer ramps (434), two second outer ramps (435), two third outer ramps (436) and an outer flat plane (437). The outer initial edges (431,432) include a first inner initial edge (431) and a second inner initial edge (432). The first outer ramps (434) are curved and are connected respectively to the outer initial edges (431,432). Each first outer ramp (434) has a first end connected to a corresponding outer initial edge (431,432), a second end (4341) and a thickness gradually increasing from the first end to the second end (4341) of the first outer ramp (434). The second outer ramps (435) are curved and are connected respectively to the second ends (4341) of the first outer ramps (434). Each second outer ramp (435) has a first end connected to the second end (4341) of a corresponding first outer ramp (434), a second end (4351) and a thickness gradually decreasing from the first end to the second end (4351) of the second outer ramp (435). The third outer ramps (436) are curved and are connected respectively to the second ends (4351) of the second outer ramps (435). Each third outer ramp (436) has a first end connected to the second end (4351) of a corresponding second outer ramp (435), a second end and a thickness gradually increasing from the first end to the second end of the third outer ramp (436). The outer flat plane (437) is formed between the second ends of the third outer ramps (436).

In a preferred embodiment, the slope of the first inner ramps (424) equals to that of the first outer ramps (434); the slope of the second inner ramps (425) equals to that of the first outer ramps (435); the slope of the third inner ramps (426) equals to that of the first outer ramps (436). And the inner recess (423) and the outer recess (433) are located opposite to each other at 180 degrees. In such a design, the rotating pressing disk (40) provides a symmetric traveling inward and outward track for the station pressing disk (50) so as to obtain a stable rotation.

The stationary pressing disk (50) slidably mounted around the pintle (10) and has a noncircular central hole (501) configured to match the shape of the pintle (101), a protrusion face having an inner protrusion (51) and an outer protrusion (52) formed thereon. The noncircular central hole (501) is defined through the stationary pressing disk (50) and is mounted securely around the pintle (10). The protrusion face faces to and abuts with the track face of the rotating pressing disk (40). The inner protrusion (51) is curved, is formed on and protrudes from the protrusion face and contacts slidably with the inner track (42) on the rotating pressing disk (40). The inner protrusion (51) has a contacting surface (510) and two oblique guiding surfaces (511). The contacting surface (510) is formed on the inner protrusion (51), contacts slidably with the inner track (42) and has a length larger than a distance between the inner initial edges (421,422) but smaller than a distance between the second ends (4241) of the first inner ramps (424). The oblique guiding surfaces (511) are formed respectively on two sides of the contacting surface (510) on the inner protrusion (51). The outer protrusion (52) is curved, is formed on and protrudes from the protrusion face and contacts slidably with the outer track (43) on the rotating pressing disk (40). The outer protrusion (52) has a contacting surface (520) and two oblique guiding surfaces (521). The contacting surface (520) is formed on the outer protrusion (52), contacts slidably with the outer track (43) and has a length larger than a distance between the outer initial edges (431,432) but smaller than a distance between the second ends (4341) of the first outer ramps (434). The oblique guiding surfaces (521) are formed respectively on two sides of the contacting surface (520) on the outer protrusion (52). In the preferred embodiment, the inner protrusion (51) and the outer protrusion (52) are formed respectively on two ends of a diameter of the stationary pressing disk (50) to make the inner and outer protrusions (51,52) abut the corresponding first, second or third ramps (424,425,426,434.435.436) at the same time.

The biasing assembly (60) is mounted around the pintle (10) and presses against the stationary pressing disk (50) to make the protrusion face of stationary pressing disk (50) abutting with the track face of the rotating pressing disk (40). The biasing assembly (60) comprises multiple resilient discs.

The fastener (80) is mounted securely on one end of the pintle (10) to hold the rotating pressing disk (40), the stationary pressing disk (50) and the biasing assembly (60) on the pintle (10) and may be a nut screwed with the outer thread (11) on the pintle (10).

The at least one friction disk (70) is mounted around the pintle (10). In the preferred embodiment, three friction disks (70) are implemented. The first one is mounted between the enlarged head (12) on the pintle (10) and the rotating leaf (30), the second one is mounted between the stationary pressing disk (50) and the biasing assembly (60), and the third one is mounted between the biasing assembly (60) and the fastener (80).

Figure 10:
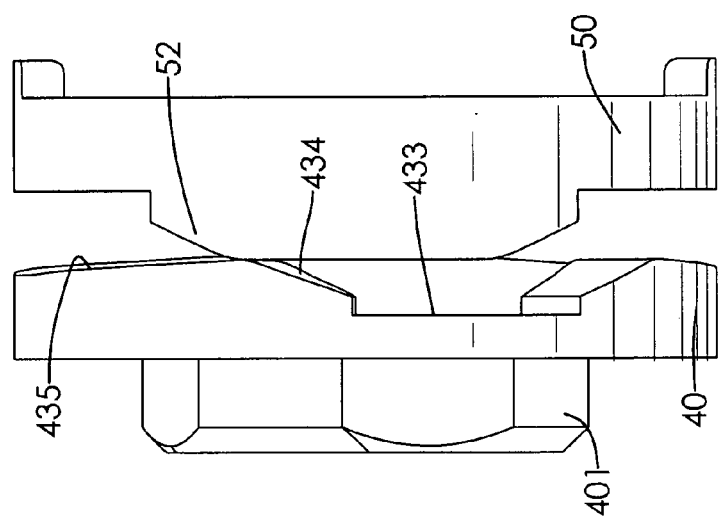
Figure 9:
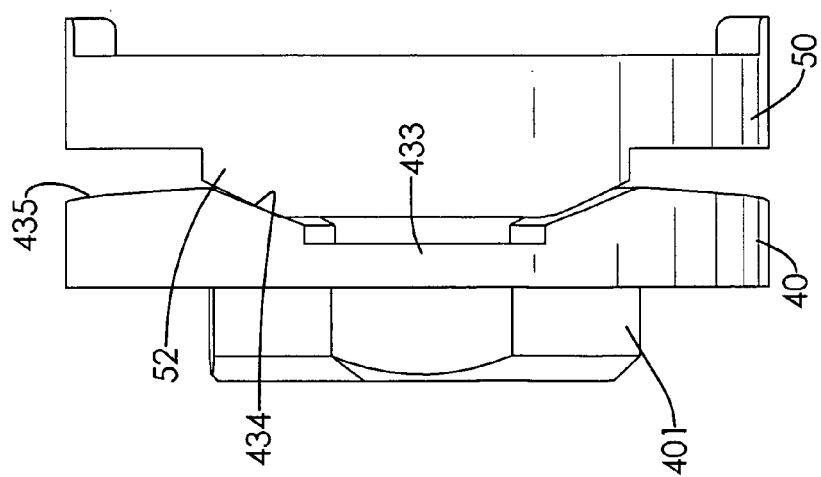

With reference to FIGS. 7 and 9 to 10, when the cover (91) is pivoted and opened relative to the base (92), the rotating leaf (30) and the rotating pressing disk (40) are rotated together relative to the pintle (10) and the stationary pressing disk (50). With the relative rotation between the rotating pressing disk (40) and the stationary pressing disk (50), the inner and outer tracks (42,43) respectively slide relative to the inner and outer protrusions (51,52), and torques vary as follows during the opening rotation. As the rotating pressing disk (40) being rotated to a position where the first inner and outer ramps (424,434) abut with the inner and outer protrusions (51,52), respectively, the torque is gradually increased due to increasing thickness of the first ramps (424,434) from the first ends to the second ends (4241,4341) so as to hold the cover (91) in the closing position. If the external force is continually exerted on the cover (91) until the inner and outer protrusions (51,52) of the stationary pressing disk (50) pass the second ends (4241,4341) of the first ramp (424, 434), then torque is quickly decreased due to the contour of the second end (4251) of the second inner ramp (425) and biasing assembly (60) releasing its elastic force which give users a feeling of lighter torque. This is a friendly design for a user with only one hand to easily open a cover to an angle within about 90 degrees or more.

When the rotating pressing disk (40) is rotated to a position where the third inner and outer ramps (426,436) abut with the inner and outer protrusions (51,52), the torque of the hinge is increased due to the increasing thickness of the third ramps (426,436) from the first ends to the second ends. Accordingly, the rotating angle of the cover (91) is gradually positioning.

Figure 8:
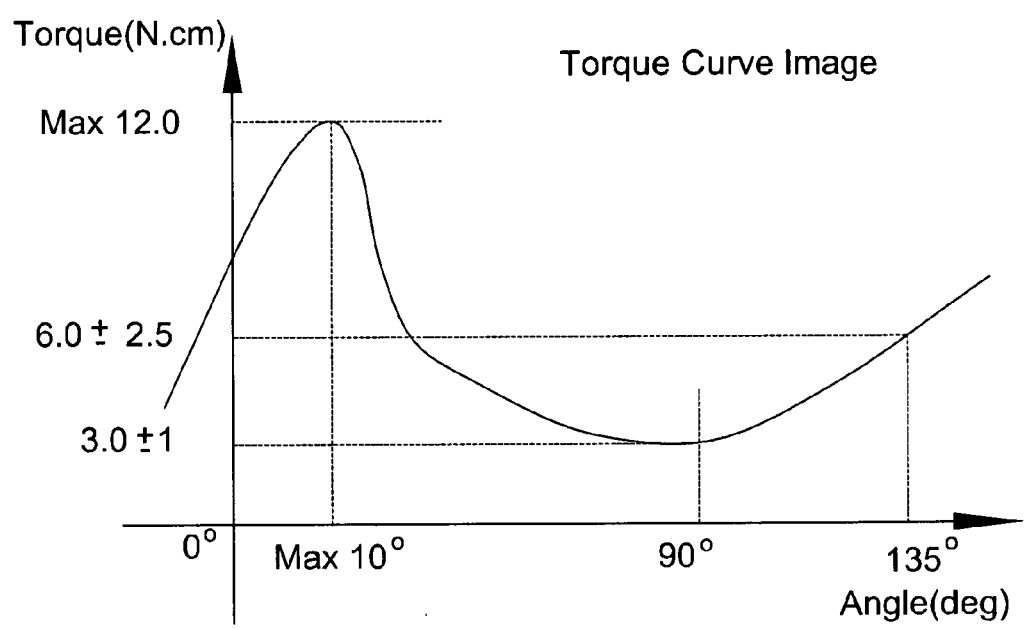
FIG. 8 is a curve diagram showing the torque required to rotate the hinge assembly in FIG. 1.
Figure 11:
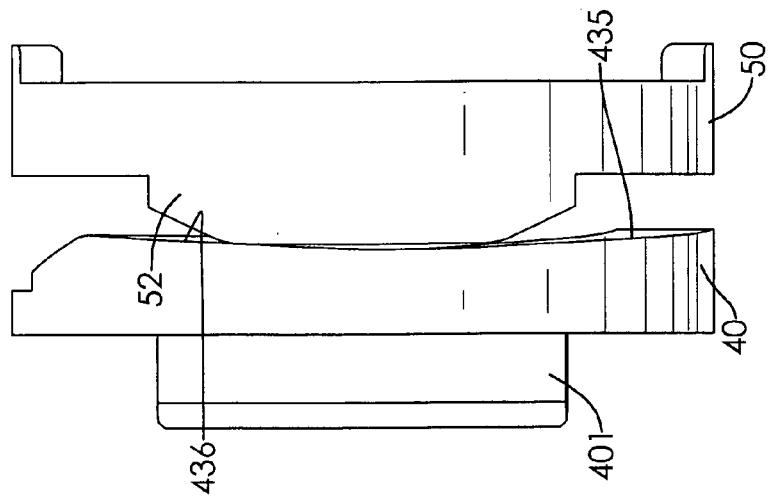
FIGS. 9 to 11 are operational side views of the pressing disks of the hinge assembly in FIG. 1.

As shown in FIG. 8, at the very beginning of the opening process, a larger torque is provided about 10 degrees by the hinge so as to hold the cover (91) in the closing position. The larger torque also helps to prevent the cover (91) from hitting the base (92) by expectedly rapidly closing the cover (91). Next, the smaller torque is gradually provided for users' easily opening the cover (91) until 90 degrees and then finally the torque is increasing to facilitate positioning the cover (91) and prevents over-rotating the cover (91).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly comprising:
   a pintle;
   a rotating leaf mounted rotatably around the pintle;
   a rotating pressing disk mounted rotatably around the pintle, attached non-rotatably to the rotating leaf and having
      a track face facing opposite to the rotating leaf;
      an annular inner track formed on the track face and having
         an inner recess having two edges opposite to each other defined as inner initial edges;
         two first inner ramps connected respectively to the inner initial edges and each having a first end connected to a corresponding one of the first inner initial edge, a second end and a thickness gradually increasing from the first end to the second end;
         two second inner ramps connected respectively to the second ends of the first inner ramps and each having a first end connected to the second end of a corresponding one of the first inner ramps, a second end and a thickness gradually decreasing from the first end to the second end of the second inner ramp; and
         two third inner ramps connected respectively to the second ends of the second inner ramps and each having a first end connected to the second end of a corresponding one of the second inner ramps, a second end and a thickness gradually increasing from the first end to the second end of the third inner ramp; and
      an annular outer track formed on the track face circumferentially around the inner track and having
         an outer recess being located opposite to the inner recess, having two edges opposite to each other defined as outer initial edges;
         two first outer ramps connected respectively to the outer initial edges and each having a first end connected to a corresponding one of the outer initial edges, a second end and a thickness gradually increasing from the first end to the second end of the first outer ramp;
         two second outer ramps connected respectively to the second ends of the first outer ramps and each having a first end connected to the second end of a corresponding one of the first outer ramps, a second end and a thickness gradually decreasing from the first end to the second end of the second outer ramp; and
         two third outer ramps connected respectively to the second ends of the second outer ramps and each having a first end connected to the second end of a corresponding one of the second outer ramps, a second end and a thickness gradually increasing from the first end to the second end of the third outer ramp;
   a stationary pressing disk mounted non-rotatably around the pintle and having
      a protrusion face facing to and abutting with the track face of the rotating pressing disk;
      an inner protrusion formed on and protruding from the protrusion face and contacting slidably with the inner track on the rotating pressing disk; and
   an outer protrusion formed on and protruding from the protrusion face and contacting slidably with the outer track on the rotating pressing disk;
   a biasing assembly mounted around the pintle and urging the stationary pressing disk toward the rotating pressing disk; and
   a fastener mounted securely on one end of the pintle to hold the rotating pressing disk, the stationary pressing disk and the biasing assembly on the pintle.

2. The hinge assembly as claimed in claim 1, wherein
the inner track of the rotating pressing disk further has an inner flat plane formed between the second ends of the third inner ramps; and
the outer track of the rotating pressing disk further has an outer flat plane formed between the second ends of the third outer ramps.

3. The hinge assembly as claimed in claim 2, wherein
the inner protrusion on the stationary pressing disk comprises a contacting surface contacting slidably with the inner track and having a length larger than a distance between the inner initial edges but smaller than a distance between the second ends of the first inner ramps; and
the outer protrusion on the stationary pressing disk comprises a contacting surface contacting slidably with the outer track and having a length larger than a distance between the outer initial edges but smaller than a distance between the second ends of the first outer ramps.

4. The hinge assembly as claimed in claim 3, wherein
the inner protrusion on the stationary pressing disk comprises two oblique guiding surfaces formed respectively on two sides of the contacting surface on the inner protrusion; and
the outer protrusion on the stationary pressing disk comprises two oblique guiding surfaces formed respectively on two sides of the contacting surface on the outer protrusion.

5. The hinge assembly as claimed in claim 4, wherein
the rotating leaf further has a through hole defined through the rotating leaf and mounted rotatably around the pintle; and
the rotating pressing disk further has an engaging flange formed on the rotating pressing disk and mounted securely in the through hole in the rotating leaf to make the rotating pressing disk rotating with the rotating leaf.

6. The hinge assembly as claimed in claim 5 further comprising a stationary leaf mounted securely on the pintle, wherein the pintle further has an enlarged head formed on the pintle at a position between the rotating leaf and the stationary leaf.

7. The hinge assembly as claimed in claim 1 further comprising a stationary leaf mounted securely on the pintle, wherein the pintle further has an enlarged head formed on the pintle at a position between the rotating leaf and the stationary leaf.

8. A portable electronic device comprising:
a base; and
a pivotable cover connected pivotally to the base with a hinge assembly, wherein the hinge assembly comprises
a pintle connected securely to the base;
a rotating leaf mounted rotatably around the pintle and connected securely to the cover;
a rotating pressing disk mounted rotatably around the pintle, attached non-rotatably to the rotating leaf and having
a track face facing opposite to the rotating leaf;
an annular inner track formed on the track face and having
an inner recess having two edges opposite to each other defined as inner initial edges;
two first inner ramps connected respectively to the inner initial edges and each having a first end connected to a corresponding one of the first inner initial edges, a second end and a thickness gradually increasing from the first end to the second end;
two second inner ramps connected respectively to the second ends of the first inner ramps and each having a first end connected to the second end of a corresponding one of the first inner ramps, a second end and a thickness gradually decreasing from the first end to the second end of the second inner ramp; and
a third inner ramp connected respectively to the second ends of the second inner ramps and each having a first end connected to the second end of a corresponding one of the second inner ramps, a second end and a thickness gradually increasing from the first end to the second end of the third inner ramp; and
an annular outer track formed on the track face circumferentially around the inner track and having
an outer recess being located opposite to the inner recess, having two edges opposite to each other defined as outer initial edges;
two first outer ramps connected respectively to the outer initial edges and each having a first end connected to a corresponding one of the outer initial edges, a second end and a thickness gradually increasing from the first end to the second end of the first outer ramp;
two second outer ramps connected respectively to the second ends of the first outer ramps and each having a first end connected to the second end of a corresponding one of the first outer ramps, a second end and a thickness gradually decreasing from the first end to the second end of the second outer ramp; and
a third outer ramp connected respectively to the second ends of the second outer ramps and each having a first end connected to the second end of a corresponding one of the second outer ramps, a second end and a thickness gradually increasing from the first end to the second end of the third outer ramp;
a stationary pressing disk mounted non-rotatably around the pintle and having
a protrusion face facing to the track face of the rotating pressing disk;
an inner protrusion formed on and protruding from the protrusion face and contacting slidably with the inner track on the rotating pressing disk; and
an outer protrusion formed on and protruding from the protrusion face and contacting slidably with the outer track on the rotating pressing disk;
a biasing assembly mounted around the pintle and urging the stationary pressing disk toward the rotating pressing disk; and
a fastener mounted securely on one end of the pintle to hold the rotating pressing disk, the stationary pressing disk and the biasing assembly on the pintle.

9. The portable electronic device as claimed in claim 8, wherein
the inner track of the rotating pressing disk further has an inner flat plane formed between the second ends of the third inner ramps; and
the outer track of the rotating pressing disk further has an outer flat plane formed between the second ends of the third outer ramps.

10. The portable electronic device as claimed in claim 9, wherein
the inner protrusion on the stationary pressing disk comprises a contacting surface contacting slidably with the inner track and having a length larger than a distance between the inner initial edges but smaller than a distance between the second ends of the first inner ramps; and
the outer protrusion on the stationary pressing disk comprises a contacting surface contacting slidably with the outer track and having a length larger than a distance between the outer initial edges but smaller than a distance between the second ends of the first outer ramps.

11. The portable electronic device as claimed in claim 10, wherein
the inner protrusion on the stationary pressing disk comprises two oblique guiding surfaces formed respectively on two sides of the contacting surface on the inner protrusion; and the outer protrusion on the stationary pressing disk comprises two oblique guiding surfaces formed respectively on two sides of the contacting surface on the outer protrusion.

12. The portable electronic device as claimed in claim 11, wherein the rotating leaf further has a through hole defined through the rotating leaf and mounted rotatably around the pintle; and the rotating pressing disk further has an engaging flange formed on and protruding from the rotating pressing disk and mounted securely in the through hole in the rotating leaf to make the rotating pressing disk rotating with the rotating leaf.

13. The portable electronic device as claimed in claim 12 further comprising a stationary leaf mounted securely on the pintle and mounted securely on the base, wherein the pintle further has an enlarged head formed on the pintle at a position between the rotating leaf and the stationary leaf.

* * * * *